Patented Aug. 14, 1928.

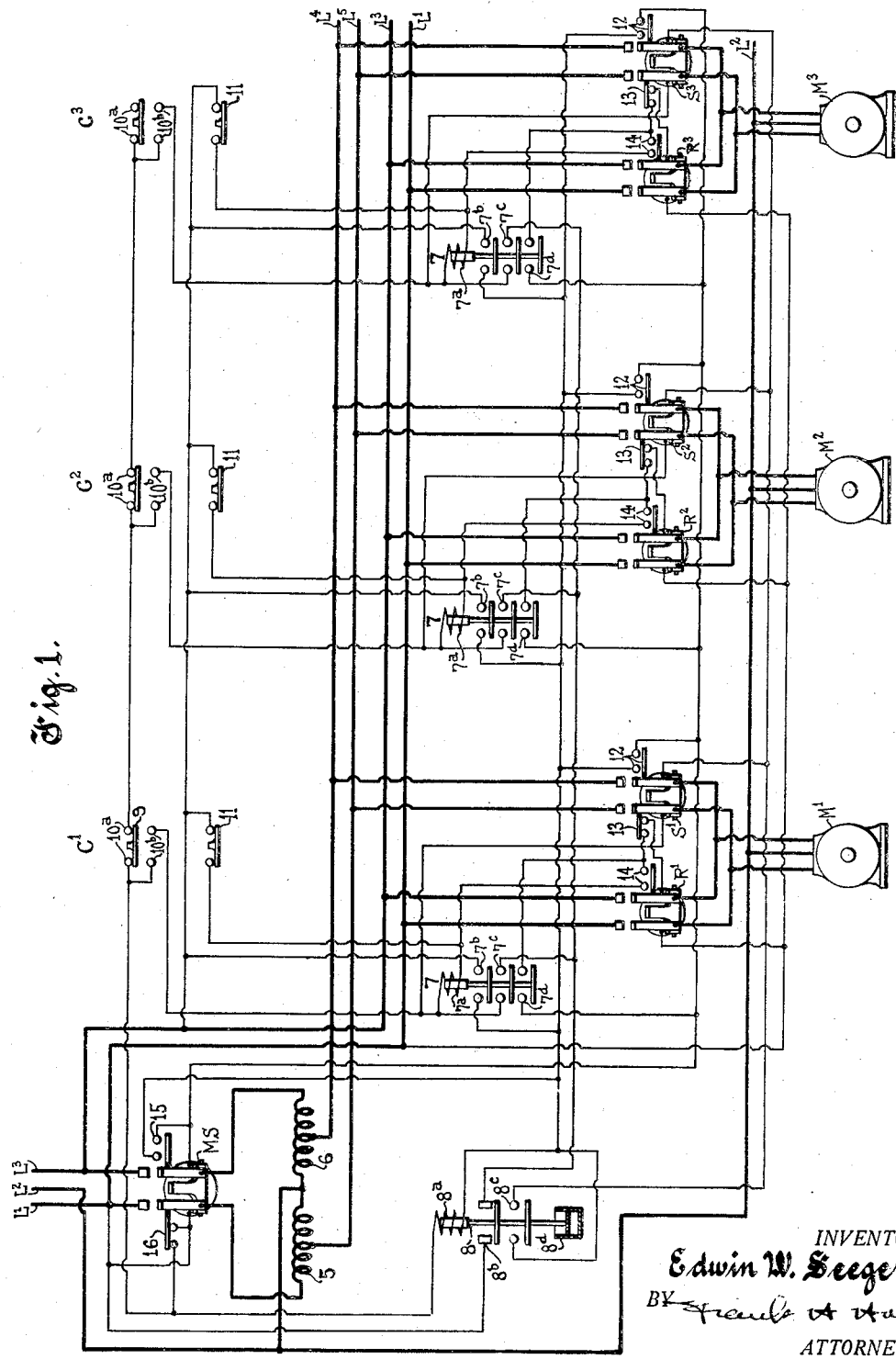

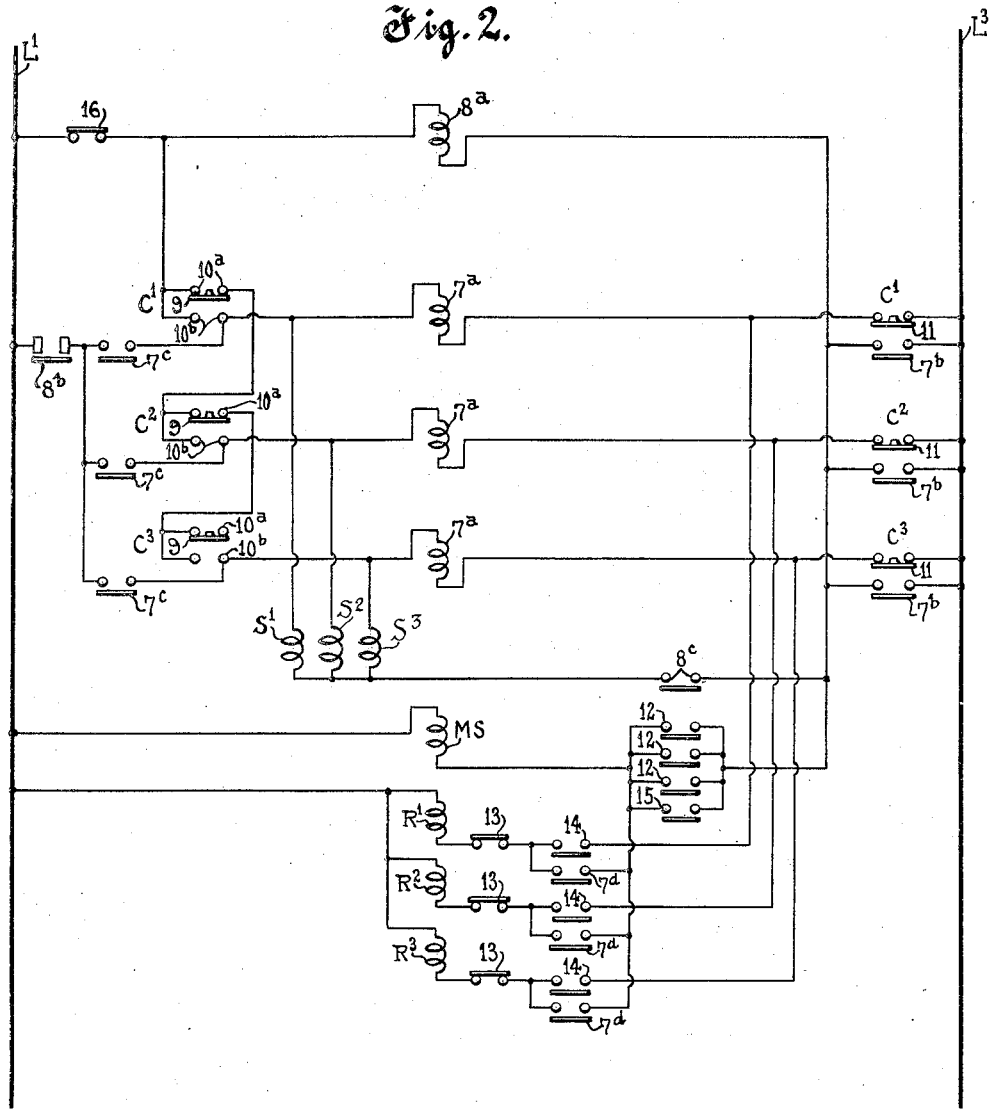

1,680,478

UNITED STATES PATENT OFFICE.

EDWIN W. SEEGER, OF SOUTH MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed June 3, 1926. Serial No. 113,355.

This invention relates to motor controllers, and is particularly applicable to systems for selectively starting a plurality of motors which are supplied with current from a common source.

The invention has among its objects to provide an improved control system of the aforesaid character which provides for selective starting of a plurality of motors through the medium of a common starting device.

Another object is to provide a control system of the aforesaid character including common control means for the motors which functions upon starting of each motor to time interruption of starting connections and establishment of running connections.

Another object is to provide a control system of the aforesaid character including means for insuring against establishment of starting connections for a plurality of motors simultaneously.

Various other objects and advantages of the invention will hereinafter appear.

The accompanying drawings diagrammatically illustrate an embodiment of the invention which will now be described, it being understood that the embodiment illustrated may be modified without departing from the spirit and scope of the appended claims.

In the drawings

Figure 1 diagrammatcally illustrates a control system embodying the invention, and Fig. 2 is an across-the-line diagram of the control circuits illustrated in Fig. 1.

Referring to Fig. 1 the same illustrates a plurality of three phase induction motors $M^1$, $M^2$, and $M^3$, said motors being of the squirrel cage type, and a common supply circuit for said motors indicated by lines $L^1$, $L^2$ and $L^3$. It will be understood that as many motors as are desired may be connected in the manner about to be described, but, in the present instance, it has been regarded as sufficient for explaining the invention to show three motors.

Each of the motors $M^1$, $M^2$ and $M^3$ has one terminal permanently connected to line $L^2$ and each motor has a pair of double pole electromagnetically operated switches S and R associated therewith for controlling the power connections thereof. Each of the switches S serves to establish low voltage starting connections for its respective motor from low voltage lines indicated by $L^4$ and $L^5$, and each of the switches R serves to connect its respective motor directly to lines $L^1$ and $L^3$ for running. Lines $L^4$ and $L^5$ are supplied with low voltage current from the supply circuit $L^1$, $L^2$ and $L^3$ through the medium of a double pole electromagnetically operated switch MS and transformer windings 5 and 6. Transformer windings 5 and 6 each have one terminal permanently connected to line $L^2$, and upon closure of switch MS the opposite terminals of said windings are respectively connected to lines $L^1$ and $L^3$. Lines $L^4$ and $L^5$ are connected to intermediate taps on transformer windings 5 and 6, respectively, and, as is well known, said lines will be supplied with low voltage current upon closure of switch MS.

In addition to the aforedescribed control means each motor has a push button station C, and an electromagnetically operated relay 7 associated therewith and the system also includes a timing relay 8 which is common to all of the motors. Each of the push button stations C includes a push button element 9 normally in engagement with stationary contacts $10^a$ and depressible for engagement with stationary contacts $10^b$. Also each push button station C includes a normally closed push button 11. Each of the relays 7 is provided with an operating winding $7^a$ and three sets of normally open contacts $7^b$, $7^c$ and $7^d$. As hereinafter set forth the relay 7 associated with each motor effects control of the starting switch S of its associated motor and also the running switch R therefor and the same also acts to control the timing relay 8. Timing relay 8 is provided with an operating winding $8^a$ and two sets of normally open contacts $8^b$ and $8^c$. Contacts $8^b$ are elongated to permit their cooperating movable contact member to slide thereon and said contacts and the contacts $8^b$ are so arranged that during opening movement of the relay the contacts $8^c$ are disengaged by their associated contact member prior to disengagement of the contacts $8^b$ by their associated contact member. As hereinafter set forth the contacts $8^b$ of the timing relay act during starting of any of the motors to control the relay 7 associated with such motor, while contacts $8^c$ act to control the starting switch S associated with such motor. Also, for purposes hereinafter set forth, the relay 8 is provided with a dashpot $8^d$ for retarding opening movement thereof.

Also for purposes hereinafter set forth each starting switch S is provided with normally open auxiliary contacts 12 arranged in the energizing circuit of the switch MS and normally closed auxiliary contacts 13 arranged in the energizing circuit of the running switch R associated with its respective motor. Also, each running switch R is provided with normally open auxiliary maintaining contacts 14 while the switch MS is provided with normally open auxiliary maintaining contacts 15 and normally closed auxiliary contacts 16 arranged between the push button stations C and line $L^1$.

The function and operation of the aforedescribed controller together with the circuit connections therefor will now be more fully described in connection with Fig. 2. Assuming that the various control parts are in the position shown in Fig. 1, upon depression of the push button 9 of the control station $C^1$ the relay 7 associated with motor $M^1$ is energized by a circuit extending from line $L^1$ through the normally closed auxiliary contacts 16 associated with switch MS, through the contacts $10^b$ of station $C^1$, to and through the operating winding $7^a$ of said relay and thence through the stop button 11 of push button station $C^1$ to line $L^3$. In responding the relay 7 associated with motor $M^1$ establishes an energizing circuit for the timing relay 8 extending from line $L^1$ through the normally closed auxiliary contacts 16 of switch MS through the operating winding $8^a$ of said relay and thence through the auxiliary contacts $7^b$ to line $L^3$. Immediately upon response of timing relay 8, relay 7 of motor $M^1$ is maintained in closed position by a circuit extending through its contacts $7^c$ and the contacts $8^b$ of said timing relay, while the starting switch $S^1$ is energized by a circuit extending from line $L^1$ through said contacts $8^b$ and $7^c$ to and through the operating winding of starting switch $S^1$ and thence through timing relay contacts $8^c$ and contacts $7^b$ to line $L^3$. Starting switch $S^1$ in responding connects the outer terminals of motor $M^1$ to lines $L^4$ and $L^5$ and the auxiliary contacts 12 of said starting switch establish an energizing circuit for switch MS extending from line $L^1$ to and through the operating winding of switch MS to and through said auxiliary contacts 12 and thence through contacts $7^b$ to line $L^3$. Switch MS in responding connects lines $L^1$ and $L^3$ to lines $L^4$ and $L^5$, respectively, through the medium of the aforedescribed transformer windings 5 and 6, and the motor $M^1$ is thus supplied with low voltage starting current. Switch MS in responding establishes a maintaining circuit for itself extending from line $L^1$ to and through its operating winding, and thence through its auxiliary contacts 15 and contacts $7^b$ to line $L^3$. Also, immediately upon closure of switch MS the auxiliary contacts 16 are opened to interrupt the aforedescribed energizing circuit for timing relay 8. Timing relay 8 then returns to normal position against the action of its associated dashpot, and as before stated the contacts $8^c$ thereof are opened prior to opening of the contacts $8^b$. Upon opening of contacts $8^c$ the aforedescribed energizing circuit for starting switch $S^1$ is interrupted and immediately upon opening of said starting switch $S^1$ running switch $R^1$ is energized by a circuit extending from line $L^1$ through the operating winding of said running switch through the auxiliary contacts 13 of the starting switch $S^1$ to and through the contacts $7^d$ and the auxiliary contacts 15 associated with switch MS and thence through the contacts $7^b$ to line $L^3$. In closing the running switch $R^1$ maintains itself by a circuit extending from line $L^1$ to and through the operating winding of said switch through the auxiliary contacts 13 associated with starting switch $S^1$ and thence through the auxiliary contacts 14 associated with said running switch and the normally closed stop push button 11 of control station $C^1$ to line $L^3$. The timing relay then returns to normal position and upon opening of its contacts $8^b$ and the relay 7 and the starting switch MS are deenergized to provide for opening thereof. The control system is then in condition to provide for starting of the other motors selectively.

The control parts for the motors $M^2$ and $M^3$ are connected in the same manner as those associated with the motor $M^1$ whereby the former motors can be also started in the manner above described. However, it should be noted that the contacts 10 of the control stations are connected in series whereby depression of any push button 9 renders all stations therebeyond ineffective. Furthermore, it should be noted that upon establishment of starting connections for any motor, all of the push button stations are rendered ineffective through opening of the auxiliary contact 16 associated with switch MS. The running switch for any motor can be opened by depressing the associated push button 11 which interrupts the maintaining circuit for such switch.

What I claim and desire to secure by Letters Patent is:

1. In a controller for a plurality of electric motors having a common supply circuit, in combination, a starting transformer, a switch for connecting said transformer to the supply circuit, a plurality of switches associated with each motor one for establishing connections to said transformer for starting and the other for establishing connections directly to the supply circuit for running, control means for said switches for preventing closure of a plurality of starting switches simultaneously and means including a relay common to all of the motors for timing opening of the starting switch of each motor and closure of the running switch therefor.

2. In a controller for a plurality of electric motors having a common supply circuit, in combination, means for supplying low voltage starting current and high voltage running current to each of the motors selectively, means for preventing starting of a plurality of motors simultaneously and means associated with the former means for effecting interruption of the low voltage starting connections of each motor and establishment of the high voltage running connections therefor after a predetermined interval.

3. In a controller for a plurality of electric motors having a common supply circuit, in combination, a pair of electro-responsive switches associated with each motor, one for establishing low voltage starting connections thereto and the other for connecting the same directly to the supply circuit for running, a push button associated with each motor and control means for said switches including a plurality of relays, each of said starting switches being controlled by its associated push button through the medium of one of said relays, and another of said relays being adapted during starting of any motor to effect opening of the starting switch associated with said motor and closure of the running switch therefor after a predetermined interval.

4. In a controller for a plurality of electric motors having a common supply circuit, in combination electro-responsive switches for selectively establishing low voltage starting connections and full voltage running connections for each motor and control means for said switches including means for preventing starting of a plurality of motors simultaneously and means comprising a single electroresponsive relay for timing interruption of starting connections and establishment of running connections for each of the motors.

5. In a controller for a plurality of motors having a common supply circuit, in combination, a transformer, an electroresponsive switch associated with each motor for connecting the same to said transformer for starting, an electroresponsive switch associated with each motor for directly connecting the same to the supply circuit for running, means for selectively controlling said starting switches and a single electroresponsive relay adapted to act upon closure of the starting switch for any motor to open such switch after a given interval and close the running switch for such motor.

6. In a controller for a plurality of motors having a common supply circuit, in combination, electroresponsive starting and running switches for each motor, a push button associated with each motor for controlling said switches, means for rendering all of said push buttons ineffective upon closure of any of said starting switches, and means associated with said former means and adapted to act upon closure of the starting switch associated with any motor to open such starting switch and close the running switch for such motor after a given interval.

7. In a controller for a plurality of electric motors having a common supply circuit, in combination electroresponsive starting and running switches for each of the motors, a push button associated with each of said motors for controlling the starting switch associated therewith, and means for rendering all of said push buttons ineffective upon closure of any of said starting switches.

8. In a controller for a plurality of electric motors having a common supply circuit, in combination, electroresponsive starting and running switches for each of the motors, a push button associated with each motor for controlling the starting switch therefor, means for rendering all of said push buttons ineffective upon establishment of starting connections for any of said motors and means including an electroresponsive relay adapted to act upon closure of the starting switch for any motor, to open such starting switch and close the running switch for such motor after a given interval.

In witness whereof, I have hereunto subscribed my name.

EDWIN W. SEEGER.